April 26, 1938.  J. H. GOLDMAN  2,115,577
STRAINER
Filed April 18, 1936  2 Sheets-Sheet 1
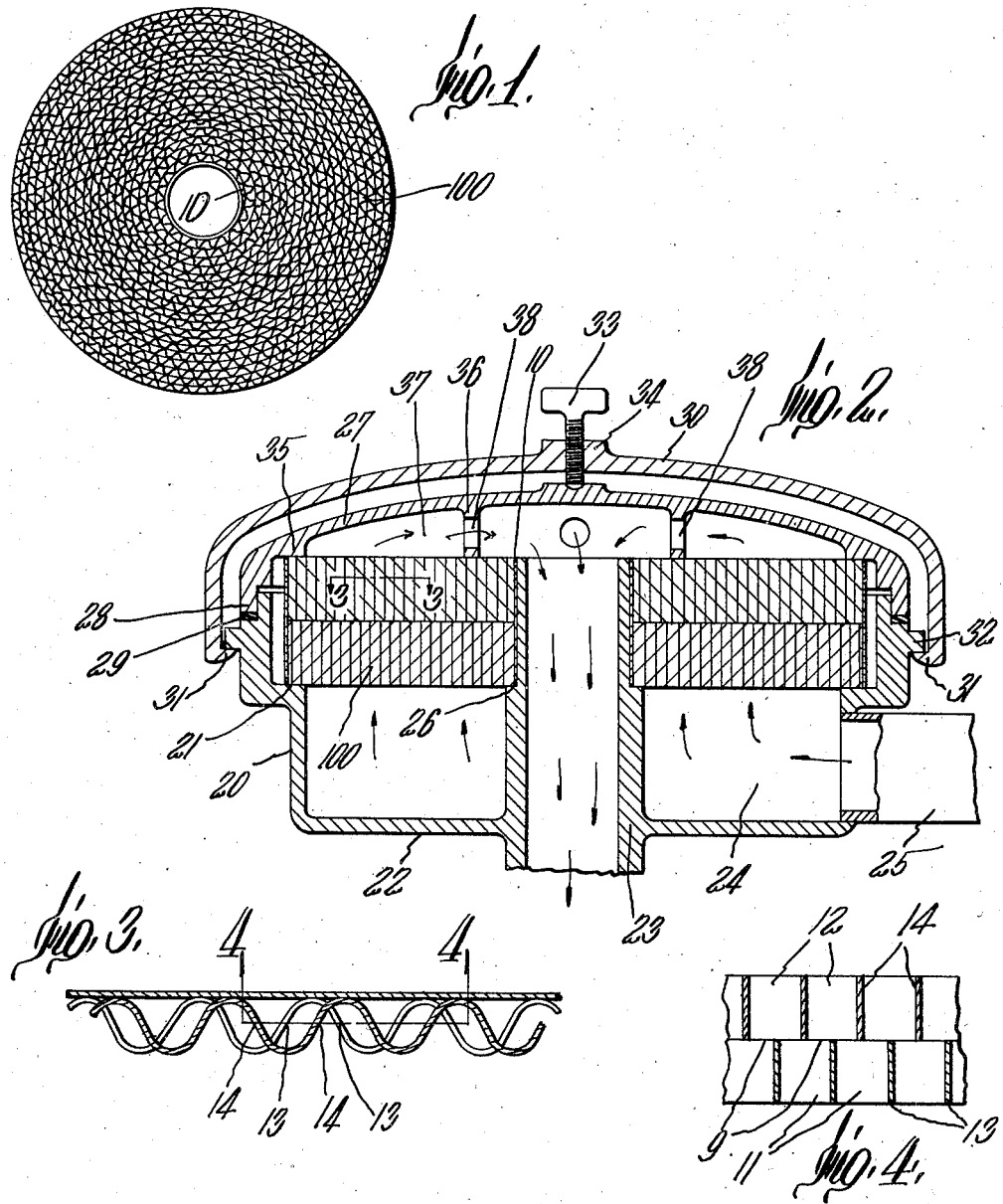
Inventor
Joshua H. Goldman
by Wright, Brown, Quinby & May
Atty's

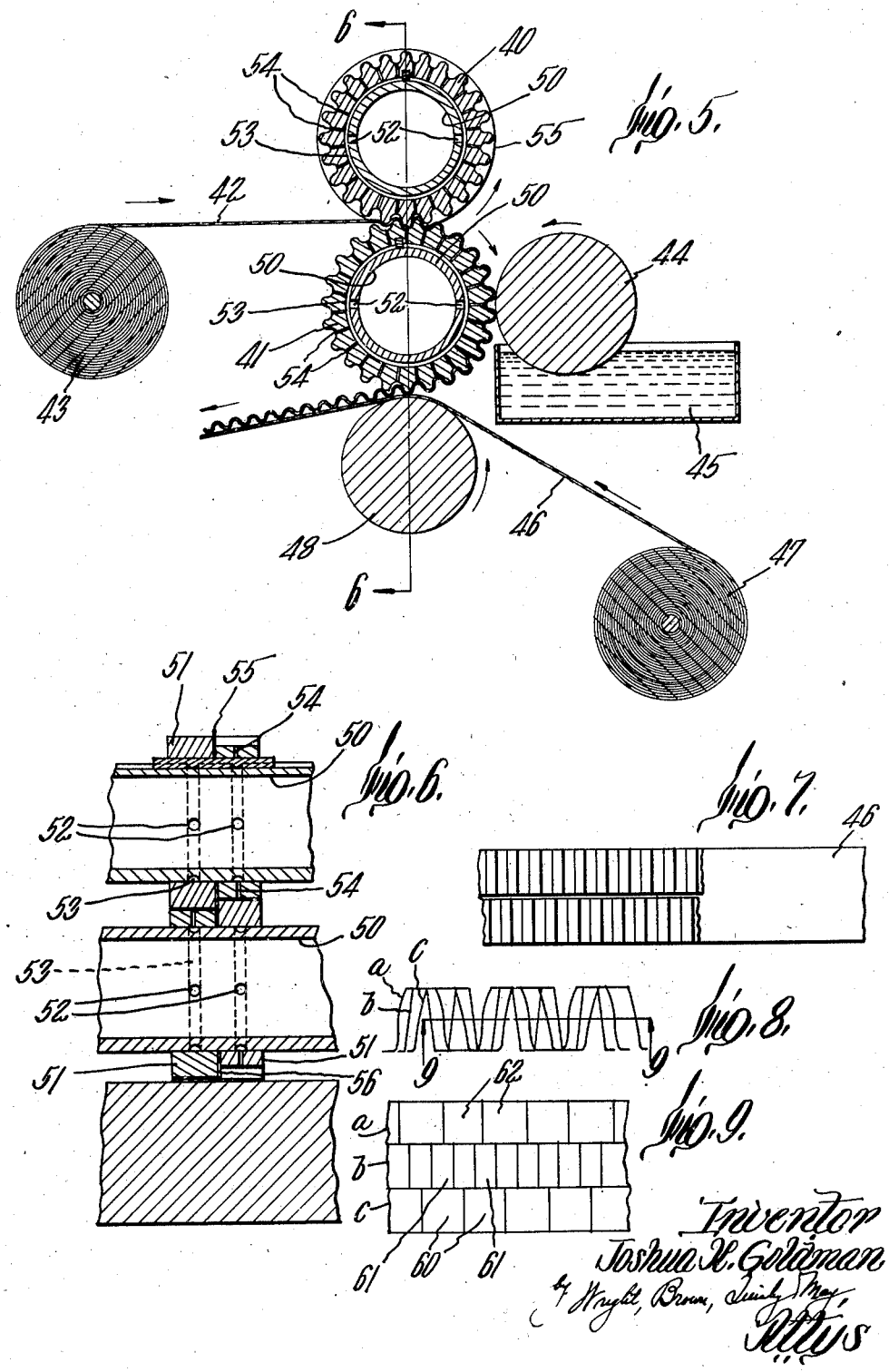

Patented Apr. 26, 1938

2,115,577

UNITED STATES PATENT OFFICE 2,115,577

STRAINER

Joshua H. Goldman, Boston, Mass., assignor to Johnson & Johnson, New Brunswick, N. J., a corporation of New Jersey Application April 18, 1936, Serial No. 75,092

4 Claims. (Cl. 210—169)

This invention relates to a strainer more particularly of a kind designed to strain out or retain suspended solids of coarse character from fluid streamed therethrough. While not limited thereto, the strainer hereof may be used to good advantage in preliminarily removing from liquids coarse impurities suspended therein as the liquid is on its way to a filter or strainer serving to rid the liquid of such fine solids or impurities as are suspended therein. In those instances when liquid being filtered is pumped or pressure-fed to the filter, as is apt to be the case, the strainer hereof is preferably installed on the suction or intake side of the pump so as to catch or retain such comparatively coarse impurities as might do injury to the pump parts if permitted to enter into the pump.

The objective of the present invention, generally stated, is to provide a strainer unit which is of simple and inexpensive make, which is capable of being rapidly assembled and removed from a suitable casing or holder, which permits substantially free flow of liquid therethrough while retaining or catching coarse impurities or suspended solids, which is of compact, unitary, light structure and hence lends itself to easy and economical handling, storing, and shipping, and which may be readily cleaned when made of durable material of construction even though it may be fabricated at such low cost from some materials, such as paper, that, as a practical matter, the disposal or discardation of the fouled strainer unit in favor of a new one is more warranted than the nuisance or labor of cleaning.

The strainer unit hereof consists of a cylindrical body containing a plurality of superposed tiers of cells, each tier of cells being in spiral array or succession with its cells arranged parallel to the axis of the body and semi-staggered relative to the cells in an adjoining tier, wherefore, liquid entering into the cells of one tier encounters the partitions defining such cells so that its very coarsest solids are caught and retained by such partitions; and, in passing into cells of the next tier, the liquid again encounters the partitions defining the cells of such tier and in so doing finer impurities suspended therein are caught in the narrower passageways at which the cells of the two tiers meet in their semi-staggered relationship. By providing two or more tiers of such cells of the same size or configuration in a strainer unit, it is possible to remove from liquids particles of a size greater than one-half that of a cell; and it is possible to remove particles of even finer size than one-half that of the cells in the first tier by providing two or more tiers of cells whose cross-sectional shapes or sizes are of appropriately different configurations in the successive tiers. Such a strainer unit may be formed up or developed by the simple expedient of convoluting into cylindrical form a band of single-faced corrugated sheet material, for instance, so-called single-faced corrugated paper, whose corrugations, unlike that of the usual corrugated sheet material, are discontinuous more especially in the sense that there are two or more adjoining rows of corrugations wherein the corrugations of one row occur in semi-staggered relationship to the corrugations of an adjacent row. The superposed convolutions or layers of sheet material are preferably united in their superposed relationship into a solid or rigid structure; and in the case of corrugated paper, adhesive union of the superposed convolutions may be advantageously effected at the regions where the crests or apices of the corrugations of one convolution contact with the plane paper ply of the adjacent convolution. In order to enable easy and proper assembly of the cylindrical strainer unit with a casing, it may be desirable to form it with a central or axial opening, in which case, the winding or convolution of the band of corrugated sheet material may take place upon a tubular core, for instance, upon a paperboard tube, when the strainer body is formed up from single-faced corrugated paper.

With the foregoing and other features and objects in view, the invention hereof will be described in further detail with reference to the accompanying drawings, wherein,—

Figure 1 shows in plan view a strainer unit embodying the present invention.

Figure 2 is a section through the unit as installed in a suitable casing.

Figure 3 represents a fragmentary section through the strainer unit on the line 3—3 of Figure 2.

Figure 4 is a section on the line 4—4 of Figure 3.

Figure 5 illustrates diagrammatically and conventionally a section through instrumentalities for forming a single-faced corrugated paper band to be convoluted into the strainer unit hereof.

Figure 6 is a section on the line 6—6 of Figure 5.

Figure 7 depicts in plan view a fragment of the resulting corrugated paper band.

Figure 8 represents a fragmentary horizontal section through a modified form of strainer unit containing three tiers of cells.

Figure 9 is a vertical section of the unit on the line 9—9 of Figure 8.

A strainer unit embodying the inventive principles hereof will be described in terms of its being fabricated from single-faced corrugated paper, as such a unit may be made at such low cost as to be discarded after only a single use, but it is to be understood that, in lieu of paper, faced corrugated sheet metal or other material of suitable flexibility on the lines of the corrugations might be employed. As appears in Figures 1 and 2, the unit includes a central core 10, for instance, a paper-board core of suitable rigidity and integrity under the action of the liquid. Assuming that milk or other aqueous liquid is being strained, the paperboard core and the corrugated paper band formed up thereon into the strainer body 100 should be properly proofed against the disintegrating action exerted thereon by the aqueous vehicle of the liquid being strained. A suitable proofing treatment will be presently described.

The body of the strainer is, as already indicated, developed or formed up by convoluting a band of single-faced corrugated paper onto the tube or core 10 until the desired body-diameter has been attained. In so doing, there are produced at once a plurality of tiers of cells, each tier of cells being in spiral array or succession and, as appears from the two-tier strainer unit of Figures 2, 3, and 4, the cells 11 of the lower tier of which are arranged in semi-staggered relationship to the cells 12 of the upper tier. The cell size defined by the partitions or walls 13 in the lower tier, which partitions are afforded by the corrugated and plane plies of the single-faced corrugated paper, determine the size of coarse particles caught or retained by the lower tier of cells as liquid to be strained is streamed upwardly through the strainer unit. In passing from the lower tier of cells into the upper tier of cells, smaller particles are arrested and retained by the partitions or walls 14 similar to the walls 13 but defining the upper tier of cells; and when the partitions 14 are semi-staggered relative to the partitions 13 of the lower tier to create passageways 9 into the upper cells of only one-half the area of the lower cells, as depicted in Figures 3 and 4, it is possible to strain out substantially all particles of a size greater than one-half the maximum span of the lower cells 11. As is well known to those skilled in the art, paper may be corrugated to provide comparatively small cells, for instance, six or even more cells per inch. Since the particle size retained or caught by the strainer hereof may be one-half that of the cell size in a two-tier strainer unit, it becomes possible to remove by such a unit suspended particles of dimensions exceeding one-twelfth inch and even finer particles. In this connection, it might be observed that by providing more than two tiers of cells of different cross-sectional areas or configurations, as by building up the strainer unit from single-faced or double-faced appropriately corrugated paper, it is possible to restrain particles of a size even less than one-half that of the maximum span in an outer tier of cells.

In convoluting the single-faced corrugated paper band about the tubular core 10, it is preferable first to coat its plane paper ply with a suitable adhesive so that the successive convolutions may become bonded together into the desired unitary structure at the regions where the apices or crests of the successive corrugations contact with the adjacent plane paper ply. Certain papers, such as parchment, resist well the disintegrating influence of aqueous and oleaginous liquids; and when, in such case, the adhesive for uniting the convolutions is of suitable character, such as a self-tanning or water-insoluble glue, nitrocellulose cement, etc., it is unnecessary to coat the exposed surfaces of the resulting strainer unit with paraffin wax or other suitable proofing material. On the other hand, when the usual rosin or wax-sized papers are employed and these are not sufficiently liquid-repellent, for instance, water-repellent, they may be coated with a suitable repellent material. Thus, for the production of a water-repellent strainer unit, paraffin wax serves admirably as the coating material. In such case, the strainer unit may be immersed as a whole in molten paraffin wax brought to sufficiently elevated temperature to possess a fluidity such as will not clog the cells but merely deposit a thin protective coating on the exposed surfaces upon momentary immersion of the unit thereinto. The wax-dipped unit may be permitted to cool in the air. When wax-dipping of the unit is effected, it is unnecessary to pre-bond its convolutions, since the wax itself may serve as the bonding agent. In such case, all that need be done is to staple or otherwise fix in place merely the outer end portion of the convoluted corrugated paper band and then to dip the unit into the molten paraffin wax. The wax also functions to stiffen the unit and thus to do away practically completely with any tendency for the corrugations or the unit itself to become deformed during handling or service. Of course, when oil-repellency rather than water-repellency is being sought in the strainer unit, the protective coating material may be such oil-repellent material as glue or gelatin, "bakelite" varnish, or other artificial oil-resistant resin.

As shown in Figure 5, the instrumentalities for producing the corrugated paper band to be convoluted into the strainer unit includes a pair of corrugating rolls 40 and 41 into the nip of which the sheet of paper 42 to be corrugated may be progressively delivered as it is being unwound from a roll 43. When the sheet has been corrugated to the toothed or peripheral configuration of the rolls and has been carried downwardly to one side on the lower roll 41, the apices or crests of the corrugations while stiff fitted over the teeth of such roll may receive thereon a coating of suitable adhesive, as from a kissing roll 44 rotating partially submerged in a bath of adhesive 45. The adhesive-coated corrugations may then be faced on their adhesive-coated side by a plane paper ply 46 as it is being progressively unwound from a roll 47 and is being led over a guide roll 48 into contact with such coated side. The resulting single-faced corrugated band or sheet, which contains two separate or severed corrugated strips, may then be taken from the lower corrugating roll 41 through a suitable drying chamber or over drying drums (not shown), whereupon the dried single-faced corrugated paper band may be cut into suitable lengths or sections for convolution into the strainer unit.

The corrugating rolls shown herein for purpose of illustration comprise, as shown in Figure 6, hollow drums 50 whose peripheries are encompassed by annular toothed corrugating sections 51 suitably fixed thereto in substantially abutting end-to-end relationship. Two such sections, which can be considered as annular gears, or gear sections, are shown, but it is possible to provide a larger number of such sections, if desired; and it is for this reason that the drums are shown as being of considerably greater axial length than the gear sections, that is, so that they may accommodate on their peripheries more than two gear sections. Of course, the drums may be provided with trunnions at their ends and be caused to rotate by suitable means conventional in the art while steam is introduced through the trunnions into the drum hollows from which it escapes to effect the desired dampening and heating of the paper and thus to condition it for nice corrugation or conformation to the peripheries of the gear sections. The desired escape of the steam to the paper from the drum hollows may take place through apertures 52 in the drum periphery leading to peripheral grooves 53 and thence to multiple tiny passages 54 formed clear through the gear sections to the gear faces against and to which the paper is conformed.

The discontinuous or semi-staggered relationship desired in the adjoining rows or lanes of corrugations to be produced by the corrugating sections or gears 51 is realized by arranging the teeth in one section in semi-staggered relationship to the teeth of the adjoining section, as appears more particularly in Figure 5. It is obvious that this desired semi-staggered relationship in the corrugations can be had only by rupturing or severing the sheet being corrugated into two separate strips, which rupture or severance may be caused immediately before the paper sheet enters into the nip of the corrugating rolls or practically simultaneously with the corrugating action. The latter expedient of simultaneously severing the sheet 42 into two separate strips and effecting the corrugating action is illustrated as being effected by a sharp-edged annular blade or knife member 55 fixed in between the gear sections 51 of the upper roll and entering a suitable narrow clearance 56 between the confronting ends of the gear sections 51 of the lower corrugating roll. The adhesive union of the plane paper ply 46 with the severed corrugated paper strips produces, as shown in Figure 5, the desired single-faced corrugated paper band, a fragment of which is shown in plan view in Figure 7. Although no cutting or severing instrumentality is really necessary to form the adjoining rows or lanes of corrugations in semi-staggered relationship, since the corrugating action necessary therefor tends to rupture or tear the sheet at the boundary line of the rows, yet the tearing or rupturing of the sheet attending such corrugating action conduces to fuzzy edges of tear and it is hence preferable to use a sharp knife to form at such boundary line clean-cut edges from which fibers do not tend to be liberated and released into the liquid being strained.

It has already been indicated that by building a strainer unit with a suitable number of tiers of cells of appropriate cross-sectional configuration in the various tiers, it is possible to strain out or catch particles of a size less than one-half the maximum span of the cells or openings in the tier of the unit with which the liquid first contacts. This may be done by using three or more pairs of meshing gear sections 51 of variant tooth-contour for accomplishing the corrugating action on the paper sheet, such as three adjoining gear sections having successively cycloidal, trapezoidal, and involute tooth contours and productive of a corrugated paper sheet which when faced and convoluted into a strainer unit displays in fragmentary horizontal section the outline shown in Figure 8, where $a$ represents the corrugated impression left by the cycloidal tooth section, $b$, the corrugated impression left by the trapezoidal tooth section, and $c$, the corrugated impression left by the involute tooth section. Since the trapezoidal tooth section is much narrower at its pitch diameter than the other sections and hence creates a decidedly larger number of corrugations per inch, after the liquid has passed through the cells 60 in the lowermost tier, which cells correspond to the impressions left by the involute teeth, the liquid flow through each cell is subdivided as it enters the cells 61, which cells correspond to the impressions left by the trapezoidal teeth. The flow from the cells 61 into the cells 62, which corresponds to the impression left by the cycloidal teeth, is only in part subdivided, but the resultant or net effect of the successive subdivisions of flow is such that the largest size particle that can pass through the strainer unit is less than one-half the maximum span of the cells or openings 61 in the second or intermediate tier and less than approximately one-fourth of the maximum span of the cells or openings 60 in the first tier.

The strainer unit of the present invention may be used for purposes other than straining coarse solid impurities from liquids, for instance, for removing or catching solid particles or dust from air and other gases. As to this latter use, it might be noted that the large multiplicity of gas passages in the strainer unit hereof subdivides the gas flow and exposes the gas to a large aggregate surface containing interruptions or baffles which serve to trap or catch suspended solids or dust. By coating the cell surfaces or partitions with an oleaginous or sticky substance, it is possible to increase greatly the removal of the solid or dust particles as the gas in numerous independent streams pursues its interrupted or tortuous passage through the strainer unit. It is possible to vary the directionality of the corrugations from straight or parallel lines to curved lines, for instance, to the curved corrugations producible by using meshing corrugating rolls having spiral teeth, the adjoining spiral gear sections of each corrugating roll being arranged so that the adjacent ends of the two or more rows of corrugations occur suitably semi-staggered. Such curved corrugations may be of value more especially in a strainer unit for removing solids or dust from air and other gases, since sharp change in directionality of gas flow induces greater tendency toward precipitation and retention of the suspended solids or dust onto the strainer surfaces.

The strainer unit hereof may be readily installed for use in various forms of casings or holders, for instance, that shown in Figure 2. Thus, the casing may include a hollow cylindrical base or container for the strainer unit open at its top and provided on its internal side wall 20 with an annular edge 21 on which the marginal bottom edge of the strainer unit may rest. Extending axially through the container and projecting out of its bottom 22 is a discharge tube 23, which together with the lower side walls 20 defines an annular liquid-receiving compartment 24 into which the liquid to be strained is fed by a delivery pipe 25. The tubular core 10 of the strainer unit may be received snugly onto the upper portion of the discharge tube 23, which is shown provided with a shoulder 26 lying substantially in the same plane as the ledge 21 on which the lower edge of the core 10 rests. The strainer unit may be held in place by an upwardly convex cover 27 having a ring-shaped rim 28 fitted nicely into a corresponding recess in the upper edge of the container wall, a suitable annular packing or gasket 29 preferably being laid in between the mating surfaces where they are clamped together to afford the desired leakproof joint. The cover 27 may be clamped home as by curved stirrup 30 immediately above the cover and provided at its extremities with inwardly projecting lugs 31 which engage under a ring flange 32 projecting outwardly from the side wall of the container. The clamping may be done as by a wing screw 33 threaded through a central boss 34 in the stirrup and centered in a suitable recess in the cover 27. In order to prevent upward displacement or movement of the strainer unit, the cover may include suitable interior ribs, for instance, an annular marginal rib 35 and an annular inner rib 36, both of which ribs contact with the upper face of the strainer unit when the cover is brought home. The outward convexity of the cover affords an accumulation chamber 37 above the strainer unit in which the strained liquid emerging as separate streamlets from the multiplicity of straining cells accumulates on its way to the discharge tube 23. Suitable apertures 38 may be provided through the annular inner rib 36 to permit free flow of the liquid from the accumulating chamber to the discharge tube 23. The installation of the strainer unit as described presents the advantage that such coarse impurities as are arrested or caught by the strainer and are heavier than the liquid being strained tend to settle on the bottom 22 of the container and thus to make for longer useful life or straining capacity of the strainer unit before renewal or cleaning. If desired, the elimination of impurities from the sphere of straining may be promoted by feeding the liquid through the pipe 25 into the compartment 24 in a substantially tangential direction, thereby creating more or less swirling or eddying of liquid in the compartment that tends to dislodge and settle on the bottom 22 such heavy impurities as would otherwise cling to the strainer surfaces.

I claim:—

1. A fluid-strainer comprising a band and a plurality of corrugated strips secured to one face of said band in substantially abutting side-by-side relationship and with the corrugations in one strip in semi-staggered relationship to the corrugations in an adjacent strip, said band and strips being convoluted to substantially cylindrical form and the spiral succession of cells defined by said band and one corrugated strip being in communication with the spiral succession of cells defined by said band and an adjacent corrugated strip.

2. A fluid-strainer comprising a band of paper and a plurality of strips of corrugated paper adhesively secured to one face of said band in substantially abutting side-by-side relationship and with the corrugations in one strip in semi-staggered relationship to the corrugations in an adjacent strip, said band and strips being convoluted to substantially cylindrical form and the successive convolutions being adhesively united with the spiral succession of cells defined by said band and one corrugated strip being in communication with the spiral succession of cells defined by said band and an adjacent corrugated strip.

3. A liquid-strainer comprising a band of paper, a plurality of strips of corrugated paper adhesively secured to one face of said band in substantially abutting side-by-side relationship and with the corrugations in one strip in semi-staggered relationship to the corrugations in an adjacent strip, and a tubular core about which said band and strips are convoluted to substantially cylindrical form with the spiral succession of cells defined by said band and one corrugated strip in communication with the spiral succession of cells defined by said band and an adjacent corrugated strip, substantially all of the paper surfaces of said strainer being coated with material rendering said paper substantially proof to the action of the liquid to be strained thereby.

4. A strainer for aqueous liquids comprising a band of paper, a plurality of strips of corrugated paper adhesively secured to one face of said band in substantially abutting side-by-side relationship and with the corrugations in one strip in semi-staggered relationship to the corrugations in an adjacent strip, and a tubular core about which said band and strips are convoluted to substantially cylindrical form with the spiral succession of cells defined by said band and one corrugated strip in communication with the spiral succession of cells defined by said band and an adjacent corrugated strip, substantially all of the paper surfaces of said strainer being coated with paraffin wax serving to render said paper substantially proof to the action of the aqueous liquid to be strained thereby.

JOSHUA H. GOLDMAN.